United States Patent
Xiao et al.

(10) Patent No.: US 9,313,214 B2
(45) Date of Patent: Apr. 12, 2016

(54) ENHANCED SECURITY USING SERVICE PROVIDER AUTHENTICATION

(75) Inventors: Ji Xiao, Weston, FL (US); Jyh-Han Lin, Parkland, FL (US); Ronald R. Smith, Coral Springs, FL (US); Ruiqiang Zhuang, Plantation, FL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 1631 days.

(21) Appl. No.: 10/913,919

(22) Filed: Aug. 6, 2004

(65) Prior Publication Data
US 2006/0031941 A1 Feb. 9, 2006

(51) Int. Cl.
*H04L 29/06* (2006.01)
*G06F 21/51* (2013.01)
(Continued)

(52) U.S. Cl.
CPC .............. *H04L 63/126* (2013.01); *G06F 21/51* (2013.01); *H04L 9/3247* (2013.01); *H04L 9/3263* (2013.01); *H04L 63/0823* (2013.01); *H04W 12/06* (2013.01); *H04L 2209/80* (2013.01)

(58) Field of Classification Search
CPC ... H04L 63/126; H04L 9/3263; H04L 9/3247; H04L 63/0823; H04L 2209/80; H04W 12/06; G06F 21/51
USPC ......... 713/156–157, 173, 175, 176–177, 180; 726/2–10, 17, 20–21, 26–30; 455/411; 709/225, 226, 227, 229
See application file for complete search history.

(56) References Cited

U.S. PATENT DOCUMENTS 5,892,904 A * 4/1999 Atkinson ................ G06F 21/33 713/170
6,292,833 B1 * 9/2001 Liao ...................... H04W 12/08 709/219

(Continued)

FOREIGN PATENT DOCUMENTS

EP 1225513 A1 7/2002
WO 0225409 A2 3/2002

OTHER PUBLICATIONS

Otta Kolsi and Teemupekka Virtanen, "MIDP 2.0 Security Enhancements", Proceedings of the 37th Annual Hawaii International Conference on System Sciences, Jan. 5-8, 2004, pp. 1-8.*

(Continued)

*Primary Examiner* — Bradley Holder
*Assistant Examiner* — Canh Le
(74) *Attorney, Agent, or Firm* — Fox Rothschild LLP

(57) ABSTRACT

A method (100) and an apparatus (e.g., a network node (210)) for providing enhanced security using service provider authentication. In addition to authenticating an application signature (245) against a root certificate (235) stored on the network node (210), a first carrier identification (250) associated with the application (240) is compared to a second carrier identification (255). If the first and second carrier identifications match, then the application can be assigned to a trusted protection domain and granted permissions which provide privileged access to the network node. For example, the application can be granted permission to be installed and/or executed on the network node. Otherwise the application can be denied privileged access. Accordingly, a carrier's applications will be only installed onto network nodes that are intended recipients of the applications.

21 Claims, 2 Drawing Sheets

(51) Int. Cl.
*H04L 9/32* (2006.01)
*H04W 12/06* (2009.01)

(56) References Cited

U.S. PATENT DOCUMENTS

| | | | | |
|---|---|---|---|---|
| 6,584,321 | B1* | 6/2003 | Coan et al. | 455/466 |
| 6,651,063 | B1* | 11/2003 | Vorobiev | G06F 17/30609 |
| 7,079,839 | B1* | 7/2006 | Papineau | 455/418 |
| 7,240,364 | B1* | 7/2007 | Branscomb | H04L 29/12113 726/5 |
| 7,293,294 | B2* | 11/2007 | Ukai | G06F 21/10 705/59 |
| 7,437,149 | B1* | 10/2008 | Papineau et al. | 455/418 |
| 7,694,149 | B2* | 4/2010 | Niwano | G06F 21/10 713/176 |
| 2001/0047489 | A1* | 11/2001 | Ito et al. | 713/202 |
| 2002/0154632 | A1* | 10/2002 | Wang et al. | 370/389 |
| 2004/0087273 | A1* | 5/2004 | Perttila et al. | 455/41.2 |
| 2004/0120260 | A1* | 6/2004 | Bernier | H04L 61/2015 370/252 |
| 2004/0127196 | A1* | 7/2004 | Dabbish | G06F 21/10 455/411 |
| 2004/0148343 | A1* | 7/2004 | Mottes | H04W 4/00 709/203 |
| 2004/0203944 | A1* | 10/2004 | Huomo et al. | 455/466 |
| 2004/0243519 | A1* | 12/2004 | Perttila et al. | 705/75 |
| 2005/0003810 | A1* | 1/2005 | Chu et al. | 455/418 |
| 2005/0005198 | A1* | 1/2005 | Vakrat et al. | 714/37 |
| 2005/0037732 | A1* | 2/2005 | Kotzin | H04M 15/00 455/411 |
| 2006/0031681 | A1* | 2/2006 | Smith et al. | 713/182 |
| 2006/0161839 | A1* | 7/2006 | Pedersen | 715/513 |
| 2006/0277535 | A1* | 12/2006 | Ketzer | 717/168 |

OTHER PUBLICATIONS

Mobile Information Device Profile for Java 2 Micro Edition, Version 2.0; JSR 118 Expert Group, pp. 1-566, Nov. 5, 2002.*

Otto Kolsi et al.,"MIDP 2.0 Security Enhancements," Processing of the 37th Hawaii International Conference on System Science , Jan. 5-8, 2004, pp. 1-8.*

Hiroyuki Tomimori et al., "An Efficient and Flexible Access Control Framework for Java Programs in MObile Terminals," Proceesing of the 22nd International Conference on Distributed Computing Systems Workshops, 2002 IEEE, pp. 1-6.*

"The Obje Software Architecture", [online] [retrieved on Jun. 22, 2004]. Retrieved from the Internet: URL: http://www.parc.xerox.com/research/csl/projects/obje/default.html>.

"Obje Meta-interfaces", [online] [retrieved on Jun. 22, 2004]. Retrieved from the Internet: URL: http://www.parc.xerox.com/research/csl/projects/obje/metainterfaces.default.html>.

Rao, Prithvi, "Java Security Guards Embedded Networks", Nov./Dec. 2003.

European Patent Office, "Communication" European Search Report, Jul. 8, 2010, European Pat. Appln. No. 05782711.5, 6 pages, Netherlands.

* cited by examiner

ENHANCED SECURITY USING SERVICE PROVIDER AUTHENTICATION

BACKGROUND OF THE INVENTION

1. Field of the Invention

The present invention relates to communications networks, and more particularly to wireless communications networks.

2. Description of Related Art

Mobile Information Device Profile (MIDP), together with Connected Limited Device Configuration (CLDC), is a portable code runtime environment for resource-constrained devices, such as mobile telephones and personal digital assistants (PDAs). An example of a portable code environment is that known by the trade name Java, developed by Sun Microsystems, Inc. In this runtime environment, the CLDC defines a base set of application programming interfaces and a virtual machine used by the devices, and the MIDP specification defines a platform for dynamically and securely deploying networked applications to the devices. Notably, developers using MIDP can write applications once, and then deploy them to a wide variety of mobile communication devices. Such applications are referred to as MIDlets.

A MIDlet suite is a package of one or more MIDlets and consists of a Java Descriptor (JAD) file, a Java Archive (JAR) file and a manifest describing the contents of the JAR file. The JAD file contains attributes used by application management software to manage life-cycles of the MIDlets, as well as the application-specific attributes the MIDlet suite itself will use. The JAR file contains the Java class files for the MIDlet suite. Metainformation about these class files is included in the manifest.

MIDP increases access to data and services on a device, and thus a level of trust must be established between the application, the device, and the user. In version 2.0 of the MIDP, this level of trust is established using protection domains. A protection domain defines a collection of permissions that can be granted to a MiDlet suite, including access to privileged functionality on a device.

A MIDlet suite can be bound to a protection domain by properly signing the MIDlet suite in accordance with the X.509 Public Key Infrastructure (PKI) security standard. The signature process includes signing the JAR file with a signature created using a signer's private key. Together with the signature, signer certificates containing the signer's public key then are added as attributes to the JAD file. Finally, root certificates are distributed to devices on which the MiDlets will be executed to establish a basis of trust for MIDlets signed in accordance with the PKI security standard. A root certificate is an unsigned or self-signed X.509 public key certificate. A root certificate typically includes a signature from a certificate authority which confirms its authenticity.

When a MIDlet suite is downloaded to a device, the signature and signer certificates of the MIDlet suite are authenticated against the root certificates stored on the device. If the signature and signer certificates match a root certificate associated with a particular protection domain, the MIDlet suite will be bound to the protection domain and granted permissions defined therein. If the signature or signer certificates do not match a root certificate stored on the device, the MIDlet suite is assigned an untrusted status. Thus, the MIDlet suite will be denied access to privileged functionality on the device.

A carrier signed Java application will be trusted on all mobile communication devices having the appropriate root certificate. However, different carriers oftentimes use mobile communication devices having the same root certificates. In consequence, Java applications sometimes will be provided access to privileged functionality on devices for which the Java applications are not intended. Importantly, a particular carrier may not want its Java applications to be provided to devices which subscribe to another carrier. For example, carriers often provide games intended for their subscribers which can be downloaded over the Internet and transferred to a mobile communication device using a personal computer. A carrier probably would not want such games to be available to devices subscribing to another carrier. Similarly, if a mobile communication device subscribing to a first carrier is in roam mode and temporarily using a second carrier, that carrier may automatically download an application intended for the second carrier's subscribers, but which is of no use to the device. A user of the device probably would not want to tie up resources, which are already limited, with such an application.

SUMMARY OF THE INVENTION

An embodiment in accordance with the present invention relates to a method and an apparatus for providing enhanced application security using service provider authentication. More particularly, when an application is loaded to a network node, in addition to authenticating an application signature against a root certificate stored on the network node, a first carrier identification associated with the application is compared to a second carrier identification. If the first and second carrier identifications match, then the application can be assigned to a trusted protection domain and granted permissions which provide privileged access to the network node. For example, the application can be granted permission to be installed and/or executed on the network node. Otherwise the application can be denied privileged access. Accordingly, a carrier's applications will be only installed onto network nodes that are intended recipients of the applications.

The communications network can be a wireless communications network. For example, the network node can be a mobile communication device. If the network node complies with the Mobile Information Device Profile (MIDP), the first carrier identification can be identified a MIDlet suite containing the application. For example, the MIDlet suite can be parsed and the carrier identification can be identified in the parsed MIDlet suite. The first carrier identification can be identified in a manifest of a Java Archive (JAR) file and/or a Java Descriptor (JAD) file contained in the MIDlet suite. The second carrier identification can be received over the communications network or retrieved from a data store within the network node. In one arrangement, the data store can be a subscriber identity module (SIM) card.

DETAILED DESCRIPTION

An embodiment in accordance with the present invention relates to a method for providing enhanced application security using service provider authentication. More particularly, when an application is loaded to a network node, in addition to authenticating an application signature against a root certificate, a first carrier identification associated with the application is compared to a second carrier identification associated with the network node. The second carrier identification can be pre-stored on the network node, or provided to the network node when required. If the first and second carrier identifications match, then the application may be granted access to privileged functionality on the network node. For example, the application can be installed onto the network node. If the first and second identifications do not match, however, access to privileged functionality can be denied.

Figure 1:
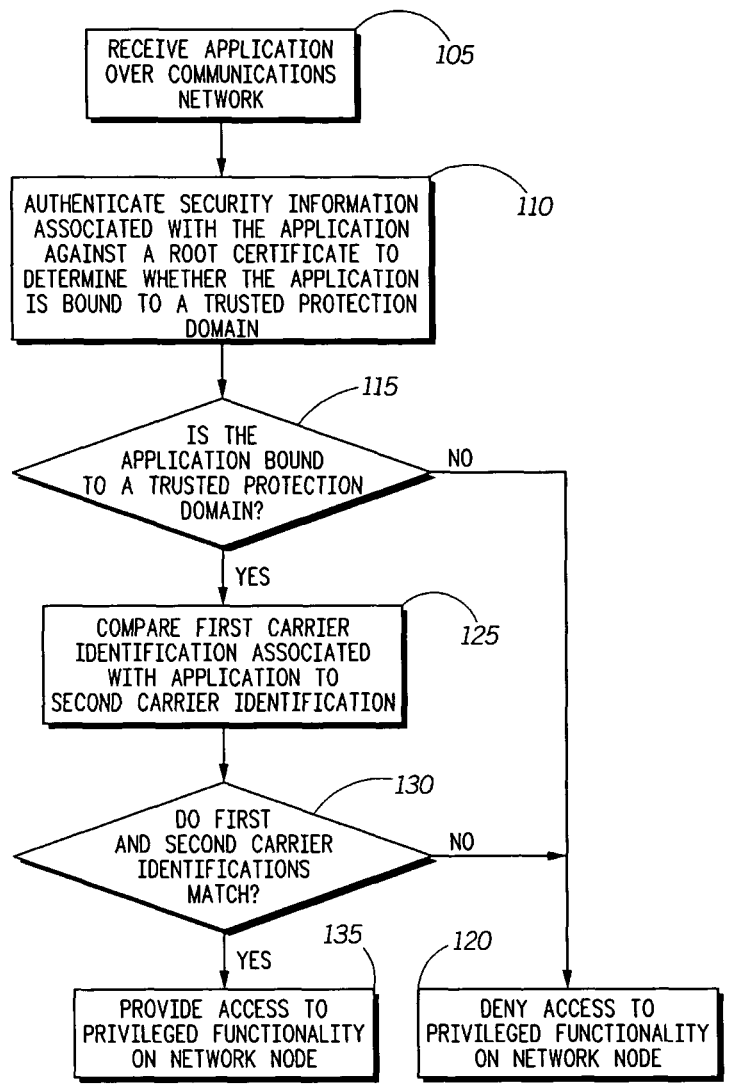
FIG. 1 is a flow chart for providing enhanced application security using service provider authentication in accordance with an embodiment of the present invention.

A flowchart is shown in FIG. 1 that is useful for understanding the method. As illustrated therein, the method 100 can include several steps beginning at step 105 with a network node receiving an application over a communications network. For example, an application can be received from a content provider over a landline and/or a wireless communications link. In an arrangement in which the runtime environment of the network node is Mobile Information Device Profile (MIDP), the application can be a MIDlet contained in a MIDlet suite. The invention is not limited in this regard, however, and the application can be any type of application that can be propagated over a communications network and installed/executed on a network node.

The application can be associated with security information that is used to establish a level of trust for the application. As defined herein, associating the application with security information can mean providing an identifier in the application which identifies a security file having the security information, providing an identifier in a file having the security information which identifies the application, or incorporating the security information into the application itself. For example, as those skilled in the art will appreciate, a signature and signer's certificates can be incorporated into the application in compliance with the X.509 Public Key Infrastructure (PKI) security standard. The invention is not so limited, however, and the skilled artisan will also appreciate that other security protocols can be implemented. At step 110, the security information associated with the application can be authenticated against a root certificate stored on the network node to determine whether the application is bound to a trusted protection domain.

Referring to decision box 115 and step 120, if the application is not bound to a trusted protection domain the application can be denied access to privileged functionality on the network node. For example, the application can be assigned to an untrusted protection domain and processed accordingly. For instance, a message can be provided on the network node to alert a user that the application is untrusted. The user then can be prompted to enter a particular user input if he wishes to proceed with installation and/or execution of the application.

If the application is bound to a trusted protection domain, a first carrier identification that is associated with the application can be compared to a second carrier identification associated with the network node, as shown in step 125. The first carrier identification can identify the carrier whose customers are the intended recipients of the application, and can be provided in a file that is received with the application. For example, the first carrier identification can be provided in the root certificate associated with the application or embedded within the application. The second carrier identification can be stored on the network node, for example in a data store, or propagated from the carrier to the network node over the communications network.

Proceeding to decision box 130 and again to step 120, if the first and second carrier identifications do not match, the application can be denied access to privileged functionality on the network node. For example, installation and/or execution of the application on the network node can be prevented, thus insuring that the application is not accessible to unauthorized users. If, however, the first and second carrier identifications match, the application can be provided access to privileged functionality on the network node, as shown in step 135. For instance, the application can be installed and/or executed on the network node.

Figure 2:
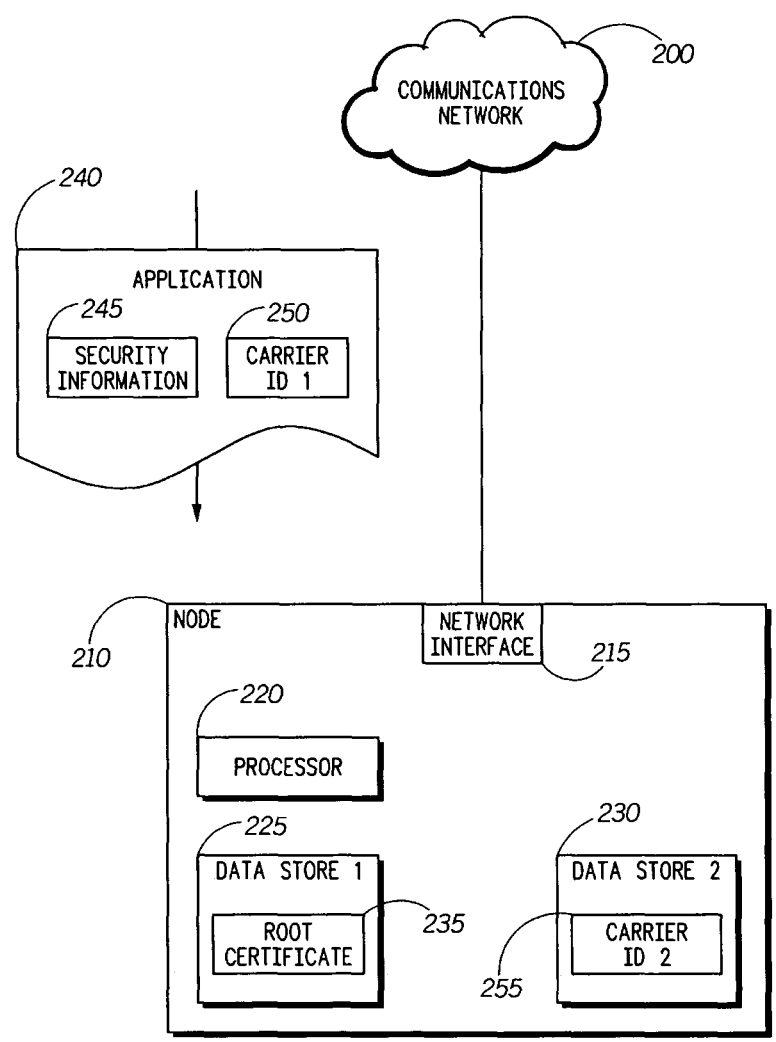
FIG. 2 is a diagram of a communications network useful for understanding the present invention.

FIG. 2 depicts an example of a communications network 200 in which the aforementioned method can be implemented. The communications network 200 can include landline and/or wireless communication links. For example, the communications network 200 can be a mobile radio communications network, a cellular telephone communications network, a telemetry system, a wide area network (WAN), a local area network (LAN), an intranet, the Internet, or any other suitable communications network.

At least one network node 210 can be communicatively linked to the communications network 200. The node 210 can be, for example, a mobile communication device, such as a mobile telephone or personal digital assistant (PDA), a computing device, or any other device which can receive an application 240 over the communications network 200.

The network node 210 can comprise a network interface 215, a processor 220, and a first data store 225. Optionally, the network also can include a second data store 230. The network interface 215 can be a landline or wireless network interface. For example, the network interface 215 can be a modem, a LAN or WAN interface, or a radio having interconnect and/or dispatch capabilities. The processor 220 can be a central processing unit (CPU), a digital signal processor (DSP), an application specific integrated circuit (ASIC), or any other processor suitable for processing an application 240 received over the communications network 200.

Each of the data stores 225, 230 can comprise an electronic storage medium, such as read only memory (ROM), flash memory or random access memory (RAM), a magnetic storage medium (e.g. a hard disk drive), an optical storage medium, a magneto-optical storage medium, or any other suitable data storage device. For example, the first and/or second data store can be a subscriber identity module (SIM) card. A SIM card can identify a user account under which the network node 210 is operated, handle authentication of the network node, and provide data storage for user data such as telephone numbers and information about the communications network 200. A SIM card may also contain applications that run on the network node 210.

A root certificate 235 can be stored in the first data store 225. For example, the root certificate 235 can be embedded in an operating system stored on the data store 225. As noted, the root certificate can be associated with a protection domain and used by the processor 220 to authenticate security information 245 associated with the application 240 when the application 240 is received by the node 210.

A first carrier identification 250 can be attached to the application 240 as a text file, embedded within program code of the application 240, incorporated within the security information, or associated with the application 240 in some other suitable fashion. For example, in the case that the application 240 is contained in a MIDlet suite, the first carrier identification 250 can be included in the MIDlet suite's descriptor file, such as a Java Descriptor (JAD) file and/or a manifest of the archive file. The archive file may be a Java Archive (JAR) file. Both the JAD file and manifest are text files containing attributes. The first carrier identification 250 can be added as an attribute to one or both of these files, and the network node's operating system can be configured to identify and process the carrier identification 250 attributes when the files are parsed.

Notably, if the X.509 PKI security standard is used, the attributes defined within the manifest of the JAR file are protected by the signature, whereas the JAD file is not. Thus, it may be desirable to use the manifest to securely pass the first carrier identification 250. Including the carrier identification 250 in both the manifest and JAD file, however, can provide an even greater level of security since the values then could be compared. Such a comparison may detect whether the JAD file or the manifest has been unscrupulously modified.

When the application 240 is received by the node 210, the processor 220 can compare the first carrier identification 250 to a second carrier identification 255. As shown, the second carrier identification 255 can be stored in the second data store 230. Alternatively, the second carrier identification 255 can be stored on another data store, such as the first data store 225.

In one arrangement, the second carrier identification 255 can be stored on the network node 210 when the network node 210 is entered into service, or at some other time prior to receiving the first carrier identification 250. In another arrangement, the second carrier identification 255 can be propagated to the network node 210 when needed by the processor 220 to perform a comparison. For example, upon receiving the application 240, the network node 210 can request a server to provide the second carrier identification 255 to the network node 210 via the communications network 200. The second carrier identification 255 can be encrypted in accordance with the implementation of the communications network 200. Such encryption techniques are known to the skilled artisan.

The present invention can be realized in hardware, software, or a combination of hardware and software. The present invention can be realized in a centralized fashion in one system, or in a distributed fashion where different elements are spread across several interconnected systems. Any kind of processing device or other apparatus adapted for carrying out the methods described herein is suited. A typical combination of hardware and software can be a processing device with an application that, when being loaded and executed, controls the processing device such that it carries out the methods described herein.

The present invention can also be embedded in an application program product, which comprises all the features enabling the implementation of the methods described herein, and which, when loaded in a processing device, is able to carry out these methods. Application program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. An apparatus for processing an application, comprising:
   a network interface comprising a receiver for receiving an application suite over a communications network, the application suite including an application, security information associated with the application, and a first carrier identification associated with the application, the first carrier identification identifying a first communication service provider whose customers are intended recipients of the application; and
   a hardware processor configured to:
   responsive to receiving the application suite, authenticate the security information against a root certificate to determine whether the application is bound to a trusted protection domain;
   when the application is bound to a trusted protected domain, compare the first carrier identification to a second carrier identification responsive to receipt of the application suite, the second carrier identification identifying a second communication service provider that is providing communication service to the apparatus, and
   responsive to identifying a match between the first and second carrier identifications, assign permissions to the application that provide access to privileged functionality on the apparatus.

2. The apparatus of claim 1, wherein said processor further authenticates a signature associated with the application against a root certificate stored in the apparatus.

3. The apparatus of claim 1, wherein the application suite is a Mobile Information Device Profile application (MIDlet) suite and wherein the processor parses the MIDlet suite and identifies the first carrier identification from the parsed MIDlet suite.

4. The apparatus of claim 3, wherein the first carrier identification is identified in at least one file selected from the group consisting of a manifest of an archive file and a descriptor file.

5. The apparatus if claim 3, wherein the first carrier identification is identified in a manifest of an archive file and from a descriptor file.

6. The apparatus of claim 1, wherein the communications network is a wireless communications network.

7. The apparatus of claim 1, wherein the apparatus receives the second carrier identification over the communications network.

8. The apparatus of claim 1, wherein the second carrier identification is retrieved from a data store within the apparatus.

9. The apparatus of claim 8, wherein the data store is a subscriber identity module (SIM) card.

10. A method for providing enhanced security at a mobile communication device that is in communication with a communication network, the method comprising:
    receiving, by a receiver of the mobile communication device from the communications network, an application suite that includes an application, security information associated with the application, and a first carrier identification associated with the application, the first carrier identification identifying a first wireless service provider whose customers are intended recipients of the application, the application being executable by the mobile communication device;
    responsive to receiving the application suite, authenticating the security information against a root certificate to determine whether the application is bound to a trusted protection domain;
    when the application is bound to a trusted protected domain, subsequent to receiving the application suite, comparing, by the mobile communication device, the first carrier identification to a second carrier identification, the second carrier identification identifying a second wireless service provider that is providing wireless communication service to the mobile communication device; and responsive to identifying a match between the first carrier identification and the second carrier identification, assigning, by the mobile communication device, permissions to the application to enable the application to access privileged functionality within the mobile communication device.

11. The method according to claim 10, further comprising:
prior to comparing the first carrier identification to the second carrier identification, determining, by the mobile communication device, whether the application is bound to a trusted protection domain; and
wherein the step of comparing comprises:
comparing the first carrier identification to the second carrier identification if the application is bound to a trusted protection domain.

12. The method according to claim 11, wherein the application includes security information, and the method further comprises:
storing, by the mobile communication device, the root certificate; and
wherein the step of authenticating the security information against a root certificate comprises:
comparing, by the mobile communication device, the root certificate to the security information to determine whether the application is bound to a trusted protection domain.

13. The method according to claim 10, further comprising:
responsive to identifying a mismatch between the first carrier identification and the second carrier identification, denying the application access to privileged functionality within the mobile communication device.

14. A method for providing enhanced security on a network node, the method comprising:
receiving, by a receiver of the network node, an application suite from a communications network, the application suite including at least one application, security information associated with the at least one application, and a first carrier identification associated with the at least one application, the first carrier identification identifying a first communication service provider whose customers are intended recipients of the at least one application;
responsive to receiving the application suite, authenticating the security information against a root certificate stored on the network node to determine whether the at least one application is bound to a trusted protection domain;
when the at least one application is bound to a trusted protected domain, comparing the first carrier identification to a second carrier identification, the second carrier identification identifying a second communication service provider that is providing communication service to the network node; and
when the first carrier identification matches the second carrier identification, assigning, by the network node, permissions to the at least one application that provide access to privileged functionality on the network node.

15. The method of claim 14, further comprising:
when the at least one application is not bounded to a trusted protection domain, denying the at least one application access to privileged functionality on the network node.

16. The method of claim 14, further comprising:
when the first carrier identification does not match the second carrier identification, denying the at least one application access to privileged functionality on the network node.

17. The method of claim 14, wherein the second carrier identification is stored on the network node.

18. The method of claim 14, further comprising:
responsive to receiving the application suite and prior to comparing the first carrier identification to the second carrier identification,
sending, by the network node, a request to a server to provide the second carrier identification, and
responsive to the request, receiving, by the network node, the second carrier identification from the server via the communications network.

19. The method of claim 14, wherein the security information includes a signature associated with the at least one application and wherein authenticating the security information against a root certificate comprises:
authenticating the signature against the root certificate.

20. The method of claim 14, wherein the security information includes the first carrier identification.

21. The method of claim 14, wherein the network node is a mobile communication device and wherein the application suite is a Mobile Information Device Profile application (MIDlet) suite, the method further comprising:
prior to comparing the first carrier identification to the second carrier identification,
parsing the MIDlet suite, and
retrieving the first carrier identification from the parsed MIDlet suite.

* * * * *